Patented Sept. 3, 1929.

1,727,165

UNITED STATES PATENT OFFICE.

CHARLES FISCHER, JR., OF WYOMING, AND WARREN T. REDDISH, OF CINCINNATI, OHIO, ASSIGNORS TO THE KONTOL COMPANY, OF DALLAS, TEXAS, A CORPORATION OF TEXAS.

PROCESS OF RECLAIMING OIL.

No Drawing. Application filed October 30, 1926. Serial No. 145,363.

Our invention relates to a process of reclaiming oil from oil and water emulsions, or from other media in which the oil may be dispersed.

The disclosure is made with particular reference to the oil and water emulsions which are undesirably incidental to petroleum producing industry, and in the oil fields constitute nuisances. These emulsions consist of oil and water, usually salt water, the percentages of the two components as well as the specie and amount of salt varying over a wide range.

The permanence of these emulsions is, according to present theories, controlled by the relative surface tensions of the oil and the water. One method of decomposing these emulsions is to treat the emulsified oil and water with a surface tension depressant which, according to theory, alters the relative surface tensions of the components, breaks the permanence of the emulsion and starts coalescence of the components. After coalescence has proceeded to a certain degree, the oil and water can be stratified by gravity settling, centrifugal force, filtration or other means and the readiness of the liquid mass for the stratification varies directly with the degree of coalescence, i. e. the size of the gathered drops. The oil thus becomes free of its water content and is available for commercial use.

The object of our invention is to provide a surface tension depressant for the oil component of an oil and water emulsion.

Another object of our invention is to provide a process of breaking oil and water emulsions by altering the surface tension of the oil component of the emulsion.

Another object of our invention is to provide a process of collecting dispersed oil by altering the surface tension of the oil particles, and accelerating their coalescence.

The preferred surface tension depressant is an oil soluble mineral oil-sulphonic acid salt.

The preferred accelerator of coalescence is a cohesive oil soluble substance such as bitumen. (See copending application, Serial No. 134,125.)

It is often desirable to handle or introduce the oil collecting reagent in the form of an aqueous solution. Among the oil soluble sulphonic acid salts adapted to be fed in aqueous solution, and adapted to carry a bituminous coalescence accelerator into aqueous solution, are the sodium sulphonate of the United States patent to Grigori Petroff, No. 1,196,274, and the sodium aluminum sulphonate of co-pending application, Serial No. 145,362, filed October 30, 1926. The latter salt is particularly soluble in respect to both oil and water. Sodium aluminum sulphonate decomposes oil and water emulsions when introduced therein in the proportion of approximately one part sulphonate to one thousand parts emulsion. A temperature of from 150°–200° F. is often beneficial to the decomposition of the emulsion. Bitumens of relatively low melting point accelerate the coalescence of the oil particles when used in combination with the sodium aluminum sulphonate. A reagent comprising, for instance, 85–95% sulphonate and 15–5% bitumen, preferably having a melting point between 35° C. and 95° C. as tested by the ball and ring method of the American Society for Testing Materials specifications, is very effective for collecting the oil particles, and can be readily fed in aqueous solution or thinned with alcohol or both.

Best results are obtained by adapting the sodium aluminum sulphonate for the particular emulsion to be treated. This sulphonic body and others described in copending application, Serial No. 145,362, filed October 30, 1926, can be made relatively oil or water soluble over a wide range by varying the proportions of the components in the direction of their solubility tendencies.

Having described our invention, we desire to be limited only by the ensuing claims:

1. In the process of decomposing oil and water emulsions, the step of introducing sodium aluminum sulphonate into said emulsions.

2. In the process of decomposing oil and water emulsions, the step of introducing sodium aluminum sulphonate and bitumen into said emulsions.

3. The process of breaking emulsions, comprising, introducing sodium aluminum sulphonate into said emulsions, and heating the same to a temperature approximating 150–200° F.

4. In the process of decomposing oil and water emulsions, the step of introducing 85–95% sodium aluminum sulphonate and 15–5% bitumen into said emulsions.

5. The process of breaking emulsions, comprising, introducing sodium aluminum sulphonate and bitumen into said emulsions, and heating the same to a temperature approximating 150–200° F.

6. In the art of decomposing petroleum and water emulsions, the step of introducing into said emulsions a bitumen and an oil soluble mineral oil sulphonate, both in aqueous solution.

7. In the art of decomposing petroleum and water emulsions, the step of introducing into said emulsions a reagent, comprising, an aqueous solution containing both mineral oil sulphonate adapted to change the surface tension of the components of the emulsions and bitumen adapted to accelerate coalescence and stratification of said components.

In witness whereof, we hereunto subscribe our names.

CHARLES FISCHER, Jr.
WARREN T. REDDISH.